Figure 1:
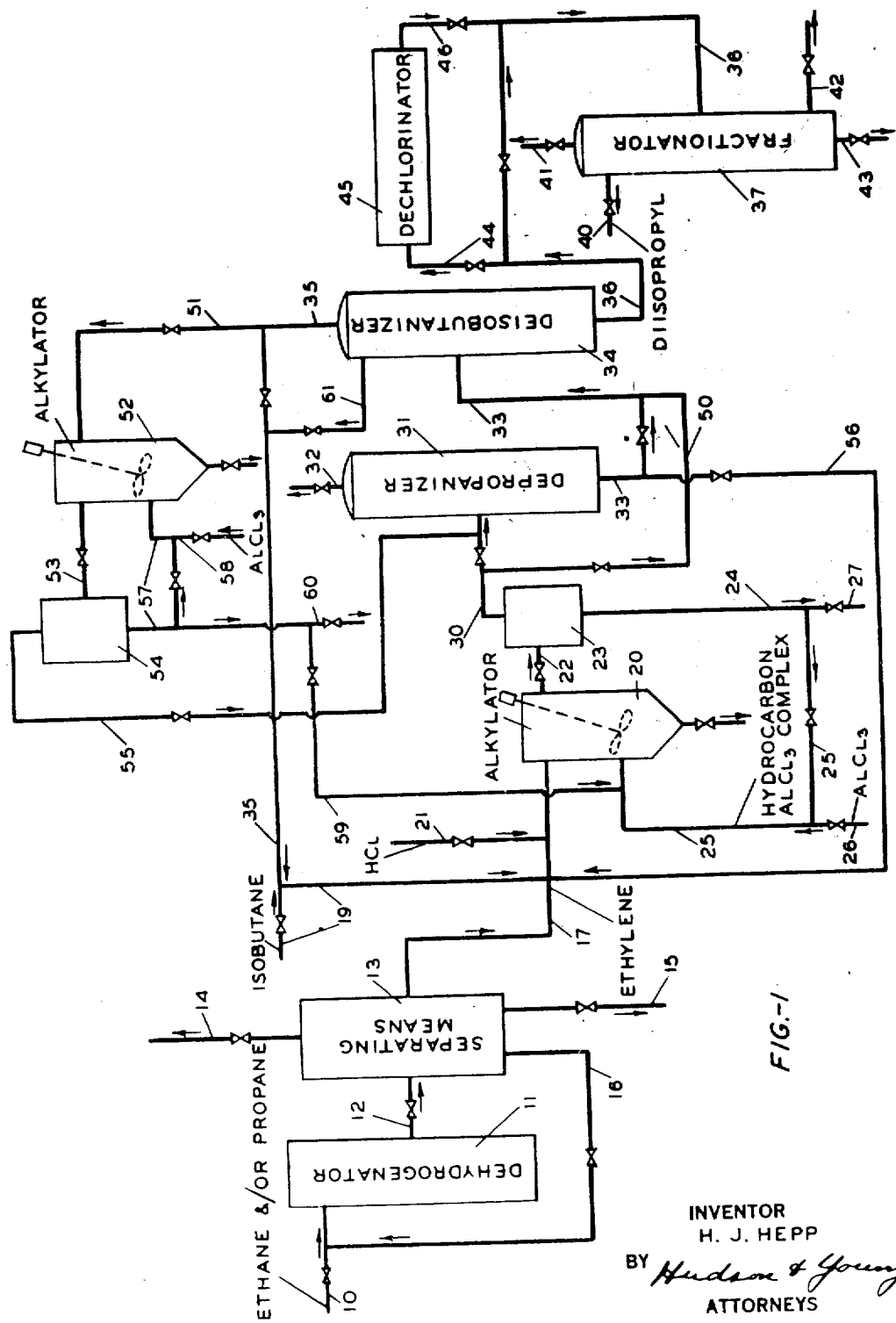

Patented Nov. 5, 1946

2,410,498

UNITED STATES PATENT OFFICE 2,410,498

ALKYLATION PROCESS

Harold J. Hepp, Bartlesville, Okla., assignor to Phillips Petroleum Company, a corporation of Delaware Application June 23, 1944, Serial No. 541,758

15 Claims. (Cl. 260—683.4)

This invention relates to the conversion of hydrocarbons in the presence of aluminum halide catalysts. In particular embodiments it relates to alkylation of alkylatable hydrocarbons by reaction with low-boiling olefins in the presence of liquid hydrocarbon-aluminum halide catalysts. In one specific embodiment it relates to the reaction of isobutane and ethylene to produce diisopropyl.

Aluminum halide catalysts have been used in numerous processes for the conversion of hydrocarbons, including decomposition or cracking of high-boiling hydrocarbons, isomerization of low-boiling hydrocarbons, and alkylation of alkylatable hydrocarbons, including isoparaffins, normal paraffins, cycloparaffins, and aromatic hydrocarbons. In such processes these catalysts have been used as such, suspended in or dissolved in a reaction mixture, suspended on solid supports such as active carbon, activated alumina or aluminous materials such as bauxite, active silica, and various clays such as fuller's earth, kieselguhr, etc., and as separate liquids in the form of complexes with organic and inorganic compounds. The more useful of the liquid complexes are those formed with paraffinic hydrocarbons, especially those formed with more or less highly branched, normally liquid paraffin hydrocarbons boiling in the boiling ranges of those fractions generally identified as gasoline and kerosine. In most instances it is desirable to have present a small amount of a hydrogen halide, sometimes only about 0.1 to about 1 to 5 per cent by weight. This material may be present as a result of side reactions, such as when water is present in a charge stock, when an organic halogen compound is present in a charge stock, when some inter-reaction between an aluminum halide and hydrocarbon takes place, or when a hydrogen halide is deliberately added. Since it is substantially impossible to effect complete dehydration of all equipment and materials, especially in a commercial process, conversions with aluminum halide catalysts are often conducted without the knowledge or appreciation that minor amounts of a hydrogen halide are present.

In the alkylation of hydrocarbons by reaction with olefins in the presence of liquid mineral acid catalysts, such as concentrated sulfuric and hydrofluoric acids, it appears that olefins, as such, disappear from the reaction mixtures with remarkable and extremely great rapidity. Thus, although the reaction time for the alkylation is generally of the order of about 5 to about 30 minutes, olefins disappear as such in the space of only a very few seconds in the presence of such catalysts. Apparently they are rapidly dissolved by the liquid catalyst and/or react with the liquid catalyst to form intermediate compounds whose identities have not as yet been fully determined. Such phenomena appear to exist, at least in part, when other liquid alkylation catalysts are used, such as liquid hydrocarbon-aluminum halide complex catalysts are used.

However, I have found that when ethylene is an olefin reactant and an aluminum halide catalyst is used as an alkylation catalyst, ethylene does not rapidly disappear as such in the manner just discussed, but often remains in the reaction mixture in appreciable quantities and can be recovered, as such, from reaction effluents even when a substantial amount of alkylation has taken place and when reaction times of the order of about 5 to about 60 minutes are used. I have further found that often there are considerable advantages which can be realized by so controlling and correlating reaction conditions that an appreciable amount of unreacted ethylene passes through the reaction zone, when using an aluminum halide alkylation catalyst. Thus, I have often found that side reactions, especially those of degradation, often take place to undesired and substantial extents when attempts are made to obtain too great an extent of ethylene reaction, or conversion. In addition, I have found that when liquid complexes of hydrocarbons and aluminum halides are used as catalysts, undesired side reactions often produce products which accumulate in the liquid complex and not only result in marked decrease in catalyst activity but also result in marked increase in catalyst viscosity. Since it is necessary to obtain, and maintain, intimate admixing of the liquid catalyst with the hydrocarbon reaction mixture in order to obtain efficient reaction and satisfactory products, an increase in catalyst viscosity results not only in increased power requirements but also in less efficient and less desirable reaction. I have further found that a liquid hydrocarbon-aluminum halide complex catalyst retains a desired degree of low viscosity in the alkylation of hydrocarbons with ethylene when the activity of the catalyst, as measured by its ability to convert ethylene, is maintained at such a level that the ethylene concentration in the reactor does not rise above about 3 mol per cent of the hydrocarbons in the reactor. This may be accomplished when using a catalyst of a given activity by increasing the reaction time, by increasing the reaction temperature, and/or by increasing the aluminum halide content of the catalyst complex. This effect may also be accomplished, at least temporarily, by the addition of a catalyst promoter such as a hydrogen halide or a low-boiling alkyl halide or the like to the reaction zone.

An object of this invention is to convert hydrocarbons in the presence of a hydrocarbon-aluminum halide complex catalyst.

Another object of this invention is to effect alkylation of alkylatable hydrocarbons with ethylene in the presence of aluminum halide catalysts.

Still another object of this invention is to maintain a liquid hydrocarbon-aluminum halide complex catalyst at a low viscosity when such a catalyst is used for the conversion of hydrocarbons.

Still another object of this invention is to react isobutane and ethylene to produce high yields of diisopropyl.

Other objects and advantages of this invention will become apparent to one skilled in the art from the accompanying disclosure and discussion.

When using liquid hydrocarbon-aluminum halide catalysts for the alkylation of hydrocarbons with olefins it is not unusual to have the viscosity of the catalyst increase during use to an extent such that it has a viscosity of about 2,000 centistokes, or more, when measured at 100° F. However, it is difficult to obtain adequate contacting between the catalyst and the hydrocarbon phases and to pump and otherwise handle the liquid catalyst when its viscosity is above about 500 centistokes at 100° F. In order to permit easy handling of the catalyst and intimate contacting thereof with the reaction mixture it is preferable to maintain the viscosity of the catalyst below 200 centistokes at 100° F. So far as is known no satisfactory method has been heretofore proposed for maintaining the viscosity of the catalyst at such a low value. I have now found that when alkylating an alkylatable hydrocarbon, in the presence of such a catalyst, I can maintain the catalyst at a suitably low viscosity by suitably regulating its activity. I have further found that when ethylene is the alkylating reactant, the catalyst activity should be so regulated that the ethylene concentration in the reaction zone is not more than about 3 mol per cent of the hydrocarbons present and that, at the same time, I can produce satisfactory yields of a desired alkylate with a minimum of by-products by maintaining the ethylene concentration in the reaction zone not less than about 0.2 mol per cent of the hydrocarbons present. Under these conditions the amount of ethylene charged which undergoes reaction is preferably about 80 per cent and more preferably is about 90 to 95 per cent but it should not be allowed to extend above about 97 to 98 per cent.

Aluminum chloride is the halide which will most generally be used in the practice of my invention although it is not outside of the broadest concepts of the invention to use other aluminum halides, particularly aluminum bromide. While aluminum fluoride generally does not give satisfactory results, mixed halides such as $AlCl_2F$, $AlClF_2$, $AlBr_2F$, and the like, may often be used successfully. Liquid hydrocarbon-aluminum halide catalysts are generally prepared by reacting a relatively pure and substantially anhydrous aluminum halide with a paraffin hydrocarbon, or paraffinic hydrocarbon fraction, at a temperature between about 150 and about 230° F. Usually, but not always, it is desirable to effect the production of the catalyst by adding during its formation a small amount of a hydrogen halide and to mix vigorously the hydrocarbon and aluminum halide until the resulting complex contains in combination from about 40 to about 70 per cent by weight of aluminum halide. Satisfactory fluid complexes have been prepared from a variety of paraffin hydrocarbons including normal heptane, isooctane, a paraffinic alkylate fraction resulting from reaction of isobutane and butylenes, and boiling above 350° F., an olefinic polymer fraction boiling in the upper part of the gasoline range, and kerosine. An essential requirement for the preparation of a good catalyst appears to be the use of a sufficiently powerful mixing to maintain the aluminum halide and the hydrocarbon in intimate contact during the period the catalyst is being prepared. In the initial stage individual particles of aluminum halide appear to become coated with a layer of sticky complex and if the mixing power is not great enough such particles tend to accumulate and/or agglomerate to form a viscous mass which settles to the bottom of the reaction vessel and further formation of the desired complex is inhibited or prevented, since unreacted aluminum halide no longer has access to the hydrocarbon phase. Two general types of catalyst have been prepared. These may be characterized as high-aluminum halide and low-aluminum halide types. When preparing a catalyst with aluminum chloride the high-aluminum chloride type contains 80 to 85 per cent by weight of aluminum chloride and is a yellow highly viscous material. The low-aluminum chloride type contains about 85 per cent by weight of aluminum chloride, is a fluid red-brown oil having a viscosity less than 200 centistokes at 100° F., and is used as the actual catalyst. The high-aluminum chloride type can be added during a continuous run in small amounts to the recirculated catalyst in order to maintain catalyst activity. Catalyst activity, however, can be maintained in other ways as by adding aluminum halide directly to recirculated catalyst or by dissolving aluminum halide in one of the streams charged to the reaction zone. The liquid complex should not be contaminated with water or other reactive, oxygen-containing compounds.

The ultimate test as to whether or not the catalyst has suitable activity is to observe the amount of unreacted ethylene present in the reaction zone. This can generally be accomplished by analyzing the effluent stream from the reaction zone since, with adequate mixing of the hydrocarbon reaction mixture and the catalyst in the zone, this effluent stream will have very nearly the same composition as the hydrocarbon phase in the reaction zone. It appears, however, that a rough estimation of the catalyst activity may be obtained by determining the heat evolved when water is added to a sample of the catalyst. When this test is made at room temperature a satisfactory catalyst will generally produce between about 275 and 350 calories per gram, preferably between about 310 and about 330 calories per gram, when sufficient water has been added to effect complete reaction.

The catalyst itself is substantially insoluble in hydrocarbons and hydrocarbons are not substantially soluble in it. It is preferred to have a volume ratio of hydrocarbons to catalyst in the reaction zone between about 9:1 and about 1:1 and the preferred ratio has been found to be about 3:2. When the reaction mixture is maintained intimately admixed with the catalyst under the preferred conditions the hydrocarbon phase is the continuous phase and the catalyst phase is the discontinuous phase. Under these conditions the catalyst readily separates from the hydrocarbons and power requirements in order to maintain a suitable intimate admixture are not excessive. However, when a greater amount of catalyst is used, it has been found that a phase inversion may take place with the result that the catalyst phase is the continuous phase and the hydrocarbon phase the discontinuous phase, which is not nearly so satisfactory. Under such conditions it is quite difficult to obtain adequate physical separation between the hydrocarbon phase and the catalyst phase and a considerable amount of power is required in order to adequately mix hydrocarbons and catalyst charged to the reaction zone.

Under the preferred conditions adequate and intimate admixing of hydrocarbons and catalyst may be obtained by efficient stirrers, by injecting reactants into the reaction zone in jets with stream velocities of 50 to 500 feet per second, by turbulent flow conditions through a long tube coil, by intimately contacting hydrocarbons and catalysts concurrently or countercurrently in vertical towers containing suitable baffle elements, or by other suitable means.

A preferred reaction temperature for this conversion is between about 50 and about 200° F., preferably about 80 to about 150° F. When alkylating hydrocarbons the activity of the catalyst herein described is sufficiently high that even ethylene undergoes rapid reaction within this temperature range. It is generally preferred to operate under a pressure such that the hydrocarbons are present in the reaction zone substantially in liquid phase and in many instances the hydrocarbon material will be kept in completely liquid phase under the preferred reaction conditions. The flow rate of reactants to the reaction zone is preferably expressed in terms of amount of product produced, and when reacting isobutane with ethylene to produce diisopropyl I prefer to operate at flow rates between about 0.2 and about 1.5 gallons of total alkylate produced per gallon of catalyst present in the reactor per hour. Thus, when reacting isobutane and ethylene in a reactor having a total internal volume of 1,000 gallons and with a hydrocarbon to catalyst ratio within the reactor of 3:2 and a flow rate of 1.25 gallons of alkylate per gallon of catalyst per hour, the flow rate of alkylate should be such that 500 gallons of alkylate are produced per hour.

Figure 2:
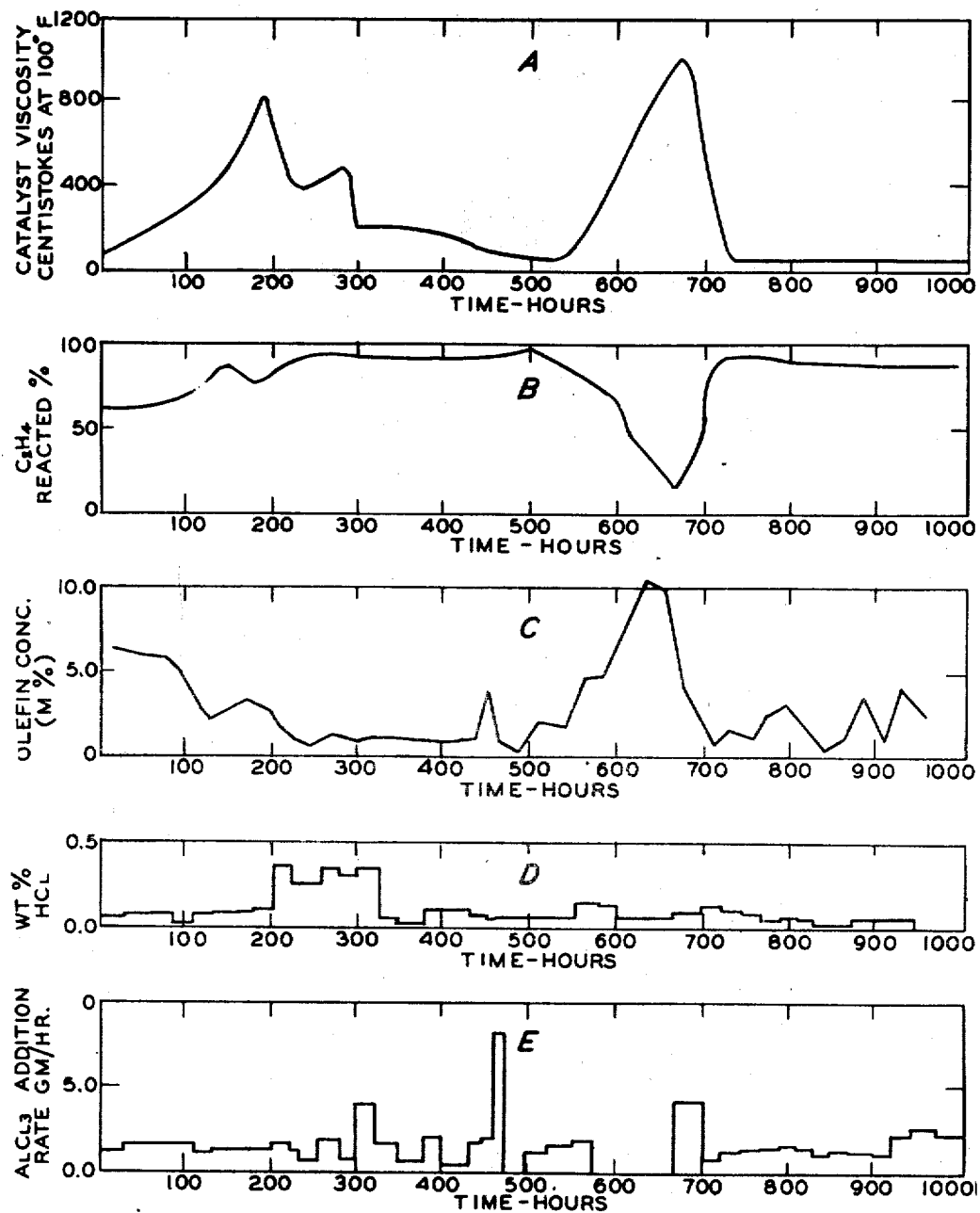

The practice of my invention will now be illustrated in connection with Figure 1 of the accompanying drawings, and in connection with the reaction of isobutane with ethylene to produce high yields of diisopropyl (2,3-dimethyl butane). Figure 1 of the drawings is a diagrammatic flow sheet which shows schematically various pieces of apparatus which may be used in the practice of two different modifications of my process which will be described in connection therewith. Figure 2 of the accompanying drawings comprises a series of curves which will be described hereinafter in connection with Example I.

Referring now to Figure 1, ethane, propane, or a mixture of the two is passed through pipe 10 to dehydrogenation unit 11. This material may be satisfactorily dehydrogenated to form an ethylene-propylene-containing mixture by being subjected to a temperature between about 1250 and 1450° F. in the absence of a catalyst and under a pressure of about 5 to about 30 lbs. gauge. The resulting reaction mixture is passed through pipe 12 to separating means 13 in which an ethylene-rich fraction is separated from methane and hydrogen, which is removed through pipe 14, from hydrocarbons having four and more atoms per molecule which are removed through pipe 15, and from an ethane-propane-propylene mixture which is removed through pipe 16 and recycled to dehydrogenator 11 for further treatment. This separation can be conveniently effected by first cooling and compressing the dehydrogenation effluent to a temperature of about atmospheric and a pressure of about 750 to 800 pounds per square inch, removing condensed hydrocarbons, passing uncondensed vapors to an oil absorption step under conditions such that about 50 to about 95 per cent of the propylene is removed, and passing unabsorbed gases to a second absorber where they are contacted at a temperature of about —30° F. with liquid isobutane as an absorbent. Gases removed from the rich absorption oil will comprise the ethane-propane-propylene mixture recycled to dehydrogenator 11 through pipe 16 and the olefin-rich liquid isobutane will comprise a suitable olefin-containing feed stock for the alkylation step. In order to obtain satisfactory reaction in the alkylation step without too great expense for the separation of ethylene from propylene in separating means 13, the molar ratio of ethylene to propylene in the charge to the alkylation step should be at least about 5:1 and need not be greater than about 10:1. Under conditions which will effect satisfactory reaction of the ethylene, higher concentrations of propylene above about 1½ mol per cent in the total net feed to the reaction zone not only result in too high a content of heptanes in the alkylate, but also result in rapid degradation of the aluminum halide alkylation catalyst. Small amounts of acetylene, which are inherently produced under such high temperature conditions as have been mentioned for the dehydrogenation, have been found not to have any great effect upon either the viscosity or activity of the liquid hydrocarbon-aluminum halide complex catalyst.

An ethylene-containing stream is removed from separating means 13 through pipe 17 and is passed to alkylator 20. Isobutane is introduced to the system through pipe 19. Hydrogen chloride may also be introduced in small quantities, such as up to about 1 per cent by weight, through pipe 21. When using a liquid hydrocarbon-AlCl₃ catalyst of satisfactory activity, addition of a hydrogen halide often is not necessary. As the activity of the catalyst tends to decrease it may be temporarily raised, so that its viscosity does not become excessive, by introducing a small amount of a hydrogen halide, such as between about 0.01 and about 1 per cent by weight of hydrogen halide. The hydrocarbon reaction mixture and catalyst are intimately contacted in alkylator 20 under conditions herein discussed and a mixture of hydrocarbons and catalyst is withdrawn through pipe 22 to settler 23. In settler 23 a heavy catalyst phase settles from the lighter hydrocarbon phase. The heavy catalyst phase may be withdrawn through pipe 24 and returned to the alkylator 20 through pipe 25. Its activity is preferably maintained by adding a suitable aluminum halide through pipe 26 either intermittently or continuously and in a form such as has been herein discussed. As the process proceeds the volume of catalyst will tend to increase and may be maintained at a desired level by suitable discharge of excess material through pipe 27. A hydrocarbon phase is removed from separator 23 through pipe 30 and is passed to depropanizer 31. Material lower boiling than isobutane is removed as an overhead product from depropanizer 31 through pipe 32. As will be appreciated, this stream will often contain some unreacted ethylene when operating under the preferred conditions discussed herein. A suitable $C_2$—$C_3$ fraction may be separated from this stream by means not shown and returned to dehydrogenator 11 through pipe 10. A butane and heavier fraction is removed from depropanizer 31 through pipe 33 and is passed to deisobutanizer 34. An isobutane fraction is removed as a low-boiling overhead product through pipe 35 and may be recycled to pipe 19 in order to maintain a satisfactory isoparaffin-olefin ratio in the reaction zone, and in the charge to the reaction zone. Such a ratio in the charge to the reaction zone is generally within the range of about 3:1 and about 10:1 on a molar basis. From the bottom of deisobutanizer 34 an alkylate fraction is removed through pipe 36 and passed to fractionator 37 for separation into desired fractions. A diisopropyl fraction may be recovered as a product of the process through pipe 40. A low-boiling hydrocarbon fraction containing any normal butane, and any pentanes produced as by-products of the reaction, may be recovered through pipe 41. One or more high-boiling alkylate fractions may be recovered through pipes 42 and/or 43. In some instances, particularly when a hydrogen halide is added to the stock, it will be found that the alkylate contains an appreciable amount of halogen compounds. Such compounds have been found to have a marked adverse influence upon the octane numbers of the various alkylate fractions and particularly upon the response of such fractions to the additions of an antidetonant such as the well known tetra-ethyl lead. In such instances it may be well to pass the alkylate fraction passing through pipe 36 through pipe 44 to dehalogenator 45 wherein these halogen compounds are removed by any suitable means. A suitable method of dehalogenation has been found to result from passing the hydrocarbon material in the neighborhood of about 700° F. over any material which is well known to be a catalyst for the decomposition of alkyl halides into olefins and hydrogen halides. A satisfactory material for this has been found to be hard granular bauxite, alone or mixed with a metal oxide such as calcium oxide or the like. Following this treatment the hydrocarbon material may be cooled, washed with an alkaline solution to remove resulting hydrogen halide, and passed through pipe 46 back to pipe 36 and fractionator 37 for fractionation as has been discussed.

A disadvantage which arises from operating the alkylation step in a manner such that effluents contain unreacted ethylene is that ethylene is present in reaction effluents in only small concentrations and is somewhat difficult to recover therefrom. I have found that one satisfactory method of overcoming this disadvantage is to separate from such effluent an ethylene-isobutane fraction and to contact this fraction in a second alkylation zone with an aluminum halide catalyst to effect further production of higher-boiling paraffin hydrocarbons. A preferred method of practicing this modification of my invention is as follows: The hydrocarbon phase from separator 23 is passed directly through pipes 30, 50 and 33 to deisobutanizer 34. The resulting low-boiling fraction is passed from pipe 35 through pipe 51 to a second alkylator 52 which may be operated under alkylation conditions herein discussed. Preferably, however, it will be operated under somewhat more severe reaction conditions than those employed in alkylator 20. Such more severe conditions preferably comprise primarily a somewhat more active alkylation catalyst. Reaction effluents are passed through pipe 53 to settler 54 wherein a heavy catalyst phase separates from a hydrocarbon phase. The hydrocarbon phase is passed from separator 54 through pipe 55 to the far end of pipe 30 so that it is introduced into depropanizer 31. In this case the low-boiling fraction removed through pipe 32 will be substantially free from unreacted olefins. A propane-free fraction is withdrawn from the bottom of depropanizer 31 and if desired may be passed entirely from pipe 33 through pipe 56 back to pipe 17 for introduction into alkylator 20. Although this fraction will contain a small amount of alkylate, its concentration will not be more than about 2 to about 4 or 5 per cent and it will be found to be economically feasible to return it in this manner. In this manner the advantages arising from the use of a second alkylator 52 can be realized without increasing the size of either depropanizer 31 or deisobutanizer 34. However, if desired all of the fraction may be passed directly to deisobutanizer 34. In either event it will be observed that the alkylate produced in both alkylation steps will be removed through pipe 36 from the bottom of deisobutanizer 34. In case it is desired to operate in the second manner it will be found desirable at the same time to pass only a part of the fraction from pipe 35 through pipe 51 to the second alkylator and to return another part of this fraction directly to pipe 19 for direct recycle to alkylator 20. In such a modification, it is often desirable to remove a recycle isobutane fraction from a point a few trays below the top of deisobutanizer 34, as through pipe 61, thus inhibiting an accumulation of methane and ethane in this recycle stream.

From separator 54 a catalyst phase is removed and recycled through pipe 57. An aluminum halide-containing material may be added through pipe 58 to maintain the activity of the catalyst at a desired level, as is herein discussed. As is also herein discussed the volume of this liquid catalyst will tend to increase as the process continues and its activity is preferably somewhat above the activity of the catalyst employed in alkylator 20. Excess quantities of catalyst may therefore be passed from pipe 57 and alkylator 52 through pipe 59 to pipe 25 and alkylator 20, thereby decreasing the amount of aluminum halide-containing material which is added through pipe 26 to maintain the activity of the catalyst in alkylator 20. Any undesired quantities may be discharged through pipe 60.

While I prefer to operate both alkylation steps with a liquid hydrocarbon-aluminum halide complex such as is discussed herein, it will be appreciated that various advantages of my process can be realized in connection with the two-step process when operating with other types of aluminum halide catalysts in either or both of the alkylation zones, and it will be appreciated that insofar as this particular modification of my invention is concerned it should not be unduly limited as to the catalyst employed in either reaction zone. In fact I have found that a very desirable aluminum-halide catalyst, which can be used quite effectively in this modification, results from supporting a hydrocarbon-aluminum halide catalyst on a porous, granular support such as hereinbefore mentioned. This may be done by forming such a complex in extraneous equipment and mixing the same with such a support to form a granular mass, or by allowing the complex to form upon the granular support during the alkylation reaction.

It will be appreciated that Figure 1 is a schematic representation of process flow, and of equipment which may be used in conducting my invention upon a commercial basis. Various specific pieces of equipment such as alkylation contactors, fractional distillation columns, pumps, control valves, heaters, coolers, catalyst chambers, and the like are well known to those skilled in the art and suitable equipment can be readily assembled for any specific application of my invention by one so skilled by following the teachings contained herein.

The viscosity of the catalyst has been successfully determined in practice by the use of a Brookfield viscosimeter. The principle upon which this instrument operates is the measure of the drag produced upon a cylinder or disk rotating at a definite constant speed while immersed in the material under test. Numerical viscosity values can be read directly from a dial. This type of instrument is particularly well adapted to the measurement of hydrocarbon-aluminum halide complexes since the complex can be protected from the air by having a hydrocarbon layer on top of the complex. Such a hydrocarbon layer will be substantially less viscous than the complex being tested and does not interfere in any way with the accuracy of the determination.

My invention will be further illustrated by the following examples. Although in these examples the hydrocarbons reacted are substantially pure, it will be appreciated that my invention can be practiced not only with such pure hydrocarbons but also with hydrocarbon materials which contain various amounts of impurities, particularly of closely related hydrocarbons with boiling points approaching those which are the primary reactants. However, such other hydrocarbons will often be present as inert materials, and in order that the capacities of the equipment used will not be unduly decreased, it will be desirable to use materials which are relatively pure. Typical examples of hydrocarbon fractions which are employed in a commercial plant for reacting isobutane and ethylene to form diisopropyl are shown in the accompanying table.

*Typical stream compositions, mol per cent*

|  | Isobutane | | Ethylene-isobutane | Reaction effluent |
|---|---|---|---|---|
|  | A | B | | |
| Methane | | | 10.4 | 4.5 |
| Ethylene | | | 35.3 | 1.2 |
| Ethane | | | 18.2 | 5.7 |
| Propylene | | | 3.1 | |
| Propane | 2.6 | 5.6 | 2.9 | 5.3 |
| Isobutane | 95.2 | 87.1 | 32.4 | 61.5 |
| Normal butane | 2.2 | 7.3 | 2.7 | 8.0 |
| Pentanes and heavier | | | | 13.8 |
|  | 100.0 | 100.0 | 100.0 | 100.0 |

In this table isobutane fractions A and B represent two different sources of isobutane. The ethylene-isobutane fraction was produced by using liquid isobutane as an absorbent in removing methane and hydrogen from effluents of a cracking step in a manner similar to that discussed in connection with separating means 13, using isobutane fraction B as the absorbent. In making up the charge to the alkylation reactor about 3 volumes of this isobutane fraction were blended per volume of the ethylene-isobutane fraction to make a total net charge to the reactor.

*Example I*

In a run which was conducted for a period of over 1000 hours, isobutane was alkylated with olefins in the presence of an aluminum chloride-hydrocarbon complex catalyst. The isobutane and olefins were pumped continuously into a reactor in which intimate contacting with the catalyst was maintained by means of mechanical agitation. The isobutane to olefin mol ratio was approximately 5:1. The olefin charge comprised approximately 90 and 10 mol per cent ethylene and propylene, respectively. Anhydrous hydrogen chloride in varying amount was added to the hydrocarbon charge. Fresh aluminum chloride, in the form of a complex with saturated hydrocarbons, was added to the reactor as needed to maintain catalyst activity. The temperature, pressure and contact time in the reactor were maintained at approximately 130° F., 300 p. s. i., and 20–25 minutes, respectively. The effluent from the reactor was allowed to settle into hydrocarbon and catalyst phases. Most of the catalyst was returned to the reactor, but the hydrocarbon phase was collected and periodically analyzed. Samples of the catalyst were obtained at intervals for viscosity determinations.

Figure 2 of the accompanying drawings shows a series of curves in which are shown the variations during the run of catalyst viscosity (curve A), olefin conversion (curve B), olefin concentration in the reactor (curve C), and the rates at which hydrogen chloride (curve D) and aluminum chloride (curve E) were added. A study of these curves reveals that when the olefin concentration in the reactor is above about 3 mol percent, i. e., a low per cent of ethylene conversion, there results an enormous increase in the viscosity of the catalyst. It is further strikingly illustrated that the activity of the catalyst, and likewise its viscosity, may be brought to and maintained at suitable values by addition of aluminum chloride and/or hydrogen chloride to the reactor.

During the first 200 hours of this run the addition rate of aluminum chloride and/or hydrogen chloride was too low to maintain the catalyst at the desired activity level, and the olefin concentration exceeded an average of about 3 mol per cent. As a result the catalyst viscosity increased to 800 centistokes (at 100° F.). At this point the hydrogen chloride addition rate was increased to about 0.3–0.4 weight per cent of the hydrocarbon charge, while the aluminum chloride addition rate was kept, on the average, at about the previous value (i. e., about 0.2 weight per cent of the hydrocarbon charge). The resulting increased catalyst activity resulted in a decrease in the olefin concentration to about 1 mol per cent, and a consequent decrease in the catalyst viscosity to 200 centistokes, in the next 100 hours. During the period 300–500 hours the average aluminum chloride addition rate was 0.3 weight per cent and that of hydrogen chloride 0.05–0.1 weight per cent. This was sufficient to maintain catalyst activity and the catalyst viscosity remained at satisfactorily low values during this period. The addition of aluminum chloride was stopped during the period 540 to 650 hours. This resulted in loss of catalyst activity as shown by an increase in the olefin concentration to above 10 mol per cent and a consequent catalyst viscosity increase to 1000 centistokes. The olefin concentration and catalyst viscosity were then reduced by adding AlCl₃ and HCl at a relatively high rate for a period of time. From this point to the end of the 1000 hour run, the addition rate of aluminum chloride and hydrogen chloride was sufficiently high to maintain the catalyst activity in the desired range, and the catalyst viscosity remained at a suitably low value. During the last 60 hours of operation the addition of hydrogen chloride was stopped, but the rate of addition of aluminum chloride was increased sufficiently to maintain catalyst activity and catalyst viscosity remained low.

Example II

In another run the viscosity of the catalyst was increased to above 1000 centistokes at 100° F. by contacting with high concentrations of ethylene. The catalyst was then contacted with a hydrocarbon feed stock containing approximately 12.5 mol per cent of ethylene, 1.8 mol per cent of propylene and 68 mol per cent isobutane under conditions similar to those shown in Example I. However, no HCl was present in this run. Catalyst activity was adjusted to effect 90 to 95 per cent conversion of the ethylene by adding AlCl₃ at a rate of 0.55 weight per cent of the hydrocarbon charge for a period of 27 hours. Ethylene conversion averaged 91 per cent for this period and climbed to approximately 99 per cent at the end. The AlCl₃ addition rate was decreased to approximately 0.009 weight per cent during the next 23 hours. Catalyst activity was sufficiently high so that ethylene conversion remained approximately at the 97 per cent level during this period.

At the end of this time catalyst viscosity was reduced to 190 centistokes at 100° F. Catalyst viscosity was maintained in the range of 110 to 200 centistokes over the next 394 hours of operation. During this period catalyst activity was maintained in the desired range, and ethylene conversion was maintained in the range of 84 to 99 per cent except for a short period when conversion fell to 77 per cent. Aluminum chloride addition rate averaged 0.2 weight per cent of the hydrocarbon feed during this period.

Example III

The effect of an excessively active catalyst on alkylate quality is shown in the following table. These alkylates were prepared under the conditions outlined in Examples I and II.

|  | Run No. | | | |
| --- | --- | --- | --- | --- |
|  | 28A | 31A | 31B | 28B |
| Per cent C₂H₄ reacted | 92.8 | 96.2 | 98.3 | 100 |
| Alkylate quality: | | | | |
| Wt. per cent pentane | 2.4 | 4.7 | 5.6 | 20.8 |
| Mol per cent diisopropyl in hexanes fraction | 94 | 90 | 87.6 | 50 |
| Pounds diisopropyl/pound ethylene reacted | 2.19 | 2.07 | 1.88 | 0.82 |

Example IV

Calcined bauxite (8–10 mesh) was impregnated with about 35% by weight of a sludge catalyst consisting of approximately 70 weight per cent of anhydrous aluminum chloride and 30 per cent of a hydrocarbon oil, the AlCl₃ and hydrocarbon oil having been heated to 176° F. and maintained at this temperature with stirring for four hours. This bauxite was placed in a tubular reactor through which was pumped (1) a stream of isobutane containing about 31 mol per cent of ethylene, (2) a stream of isobutane saturated at approximately 175° F. with anhydrous aluminum chloride, and (3) a recycle stream amounting to about 3 times the volume of (1) plus (2). The mole ratio of iC₄H₁₀ to C₂H₄ in the combined feed was approximately 4.5/1. The following data were obtained:

| | |
| --- | --- |
| Duration of experiment, hours | 40 |
| Temperature of reactor, °F | 98–212 |
| Pressure (avg.), p. s. i | 400 |
| Volume of combined feed per volume of catalyst per hour (avg.)¹ | 1.7 |
| Ethylene converted, per cent | 94–98 |
| Gallons alkylate produced per lb. AlCl₃ consumed | 10 |

¹ Streams (1) plus (2).

It is to be appreciated that various modifications of my invention can be practiced without departing from the teachings and spirit of the disclosure, or from the scope of the claims. The claims are not to be unduly limited by limitations shown in the specific examples. By alkyl derivatives I mean to include whatever products appear to be the primary reaction products. Thus, I intend to include diisopropyl as an ethyl derivative of isobutane, although it is not an "ethyl isobutane."

I claim:

1. An improved process for the production of diisopropyl by the reaction of isobutane and ethylene in the presence of a liquid hydrocarbon-AlCl₃ complex catalyst, which comprises passing to a reaction zone a hydrocarbon mixture comprising primarily isobutane and ethylene in a mol ratio between about 3:1 and about 10:1, effecting in said reaction zone an intimate admixture of a resulting reaction mixture and a liquid hydrocarbon-AlCl₃ complex catalyst having a viscosity at 100° F. not greater than about 200 centistokes, maintaining in said zone a reaction temperature between about 50 and about 200° F. and a pressure sufficient to maintain a substantially liquid hydrocarbon phase, correlating the reaction conditions and the activity of said complex catalyst in a manner such that the concentration of unreacted ethylene in the reaction zone is between about 0.2 and about 3 mol per cent of the hydrocarbons present, and such that the viscosity of said liquid complex catalyst is maintained at not greater than about 200 centistokes at 100° F., and recovering from effluents of said reaction zone a hydrocarbon fraction comprising diisopropyl so produced.

2. An improved process for the reaction of a low-boiling alkylatable hydrocarbon with ethylene to produce a monoethyl derivative thereof in the presence of a liquid hydrocarbon-AlCl₃ complex catalyst, which comprises passing to a reaction zone a hydrocarbon mixture comprising primarily a low-boiling alkylatable hydrocarbon and ethylene in a mol ratio between about 3:1 and about 10:1, effecting in said reaction zone an intimate admixture of a resulting reaction mixture and a liquid hydrocarbon-AlCl₃ complex catalyst having a viscosity at 100° F. not greater than about 200 centistokes, maintaining in said zone a reaction temperature between about 50 and about 200° F. and a pressure sufficient to maintain a substantially liquid hydrocarbon phase, correlating the reaction conditions and the activity of said complex catalyst so that the concentration of unreacted ethylene in the reaction zone is between about 0.2 and about 3 mol per cent of the hydrocarbons present and so that the viscosity of said liquid complex catalyst is maintained at not greater than about 200 centistokes at 100° F., and recovering from effluents of said reaction zone a hydrocarbon fraction comprising hydrocarbons so produced.

3. The process of claim 2 in which said low-boiling alkylatable hydrocarbon is a low-boiling isoparaffin hydrocarbon.

4. The process of claim 2 in which said low-boiling alkylatable hydrocarbon is a low-boiling cycloparaffin.

5. The process of claim 2 in which said low-boiling alkylatable hydrocarbon is benzene.

6. An improved process for the production of diisopropyl by the reaction of isobutane and ethylene in the presence of a liquid hydrocarbon-AlCl₃ complex catalyst, which comprises passing to a first reaction zone a hydrocarbon mixture comprising primarily isobutane and ethylene in a mol ratio between about 3:1 and about 10:1, effecting in said reaction zone an intimate admixture of a resulting reaction mixture and a liquid hydrocarbon-AlCl₃ complex catalyst having a viscosity at 100° F. not greater than about 200 centistokes, maintaining in said reaction zone alkylation conditions such that the concentration of unreacted ethylene is between about 0.2 and 3 mol percent of the hydrocarbons present and such that at least about 3 percent of the ethylene charged remains unreacted and also such that the viscosity of said liquid complex catalyst is maintained at not greater than about 200 centistokes at 100° F., separating from effluents of said first reaction zone a high-boiling fraction comprising diisopropyl and a low-boiling fraction comprising unreacted ethylene and isobutane, passing said low-boiling fraction to a second reaction zone and reacting same in the presence of a liquid hydrocarbon-AlCl₃ complex catalyst under alkylation conditions to effect additional formation of paraffin hydrocarbons having more than four carbon atoms per molecule, and recovering from effluents of said second reaction zone and from said high-boiling fraction diisopropyl so produced.

7. The process of claim 1 in which from effluents of said reaction zone are separated a high-boiling fraction comprising paraffin hydrocarbons having more than four carbon atoms per molecule so produced and a low-boiling fraction comprising unreacted ethylene and isobutane, passing said low-boiling fraction to a second reaction zone and reacting same under reaction conditions and in the presence of a liquid complex catalyst similar to those employed in the first reaction zone to effect additional formation of paraffin hydrocarbons having more than four carbon atoms per molecule, combining effluents of said second reaction zone and said high-boiling fraction and separating therefrom a fraction comprising diisopropyl produced in each said reaction zone.

8. An improved process for the production of diisopropyl by the reaction of isobutane and ethylene in the presence of a liquid hydrocarbon-aluminum halide complex catalyst, which comprises passing to a reaction zone hydrocarbons comprising primarily isobutane and ethylene in a mol ratio between about 3:1 and about 10:1, effecting in said reaction zone an intimate admixture of a resulting reaction mixture and a liquid hydrocarbon-aluminum halide complex catalyst having a viscosity at 100° F. not greater than about 500 centistokes, maintaining in said reaction zone an alkylation temperature and a pressure sufficient to maintain a substantially liquid hydrocarbon phase, correlating the reaction conditions and the activity of said complex catalyst in a manner such that the concentration of unreacted ethylene in the reaction zone is between about 0.2 and about 3 mol per cent of the hydrocarbon material present and such that the viscosity of said liquid complex catalyst is maintained at not more than about 500 centistokes at 100° F., and recovering from effluents of said reaction zone a hydrocarbon fraction comprising diisopropyl so produced.

9. An improved process for the reaction of a low-boiling alkylatable hydrocarbon with ethylene to produce a mono-ethyl derivative thereof in the presence of an aluminum halide catalyst, which comprises passing to a first reaction zone a low-boiling alkylatable hydrocarbon and ethylene in a mol ratio between about 3:1 and about 10:1, contacting a reaction mixture comprising said hydrocarbons with an aluminum halide alkylation catalyst under alkylation conditions such that the concentration of unreacted ethylene in the reaction effluent is between about 0.2 and about 3 mol per cent of the hydrocarbons present, separating from effluents from said first reaction zone a high-boiling fraction comprising products of said alkylation and a low-boiling fraction comprising unreacted ethylene and alkylatable hydrocarbon, passing said low-boiling fraction to a second reaction zone and reacting same in the presence of an aluminum halide alkylation catalyst under alkylation conditions to effect additional formation of alkylate, and recovering from effluents of said second reaction zone and from said high-boiling fraction an alkyl derivative so produced.

10. An improved process for the production of diisopropyl by the reaction of isobutane and ethylene in the presence of a liquid hydrocarbon-aluminum halide complex catalyst, which comprises passing to a first reaction zone hydrocarbons comprising primarily isobutane and ethylene in a mol ratio between about 3:1 and about 10:1, effecting in said reaction zone an intimate admixture of a resulting reaction mixture and a liquid hydrocarbon-aluminum halide complex catalyst, maintaining in said reaction zone an alkylation temperature and a pressure sufficient to maintain a substantially liquid hydrocarbon phase and a reaction time such that the concentration of unreacted ethylene is between about 0.2 and 3 mol percent of the hydrocarbons present, separating from effluents of said first reaction zone a high-boiling fraction comprising diisopropyl so produced and a low-boiling fraction comprising unreacted ethylene and isobutane, passing said low-boiling fraction to a second reaction zone and reacting same in the presence of a liquid hydrocarbon-aluminum halide complex catalyst under alkylation conditions to effect additional formation of diisopropyl, and recovering from effluents of said second reaction zone and from said high-boiling fraction diisopropyl so produced.

11. The process of claim 1 in which at least 5 per cent of the ethylene charged passes through the reaction zone without undergoing reaction.

12. The process of claim 8 in which at least 5 per cent of the ethylene charged passes through the reaction zone without undergoing reaction.

13. An improved process for the production of diisopropyl by the reaction of isobutane and ethylene in the presence of an aluminum halide alkylation catalyst, which comprises passing to a first reaction zone isobutane and ethylene in a mol ratio between about 3:1 and about 10:1, contacting said hydrocarbons in said reaction zone with an aluminum halide alkylation catalyst under alkylation conditions such that the concentration of unreacted ethylene in effluents from said reaction zone is between about 0.2 and about 3 mol per cent of the hydrocarbons present, separating from effluents of said reaction zone a low-boiling fraction comprising substantially all of the isobutane and lower-boiling hydrocarbons present in said effluents and a high-boiling fraction, passing said low-boiling fraction to a second alkylation zone and contacting the same therein under alkylation conditions with an aluminum halide alkylation catalyst, separating from effluents of said second alkylation zone a low-boiling fraction comprising propane and lower-boiling hydrocarbons, passing remaining hydrocarbons from the last said effluents to said first alkylation zone, and removing from the aforesaid high-boiling fraction a fraction containing diisopropyl as a product of the process.

14. An improved process for the production of diisopropyl by the reaction of isobutane and ethylene in the presence of a liquid hydrocarbon-AlCl₃ complex catalyst, which comprises passing to a first reaction zone a hydrocarbon mixture comprising primarily isobutane and ethylene in a mol ratio between about 3:1 and about 10:1, effecting in said first reaction zone an intimate admixture of a resulting reaction mixture and a liquid hydrocarbon-AlCl₃ complex catalyst having a viscosity at 100° F. not greater than about 200 centistokes, maintaining in said zone a reaction temperature between about 50 and about 200° F. and a pressure sufficient to maintain a substantially liquid hydrocarbon phase, correlating the reaction conditions and the activity of said complex catalyst in a manner such that the concentration of unreacted ethylene in the first reaction zone is between about 0.2 and about 3 mol per cent of the hydrocarbons present, and such that the viscosity of said liquid complex catalyst is maintained at not greater than about 200 centistokes at 100° F., passing hydrocarbon effluents of said first reaction zone to a separating means, separating from said means a low-boiling fraction comprising isobutane and lower-boiling hydrocarbons present in said effluents, passing said low-boiling fraction to a second alkylation zone and contacting the same therein under alkylation conditions similar to those employed in the first reaction zone and in the presence of a liquid complex aluminum chloride-hydrocarbon catalyst containing a higher proportion of aluminum chloride than the catalyst used in said first reaction zone to effect additional alkylation, removing from hydrocarbon effluents of said second reaction zone propane and lighter hydrocarbons as one fraction and isobutane and heavier hydrocarbons as a second fraction, passing a substantial portion of said second fraction directly to said first reaction zone, passing an additional portion of said second fraction to the aforesaid separating means, continuously removing a portion of the catalyst from said second reaction zone and passing same to said first reaction zone, and recovering from said separating means a hydrocarbon fraction comprising diisopropyl produced in each said reaction zone.

15. An improved process for the production of diisopropyl by the reaction of isobutane and ethylene in the presence of a liquid hydrocarbon-aluminum halide complex catalyst, which comprises passing to a first reaction zone hydrocarbons comprising primarily isobutane and ethylene in a mol ratio between about 3:1 and about 10:1, effecting in said first reaction zone in an intimate admixture of a resulting reaction mixture and a liquid hydrocarbon-aluminum halide complex catalyst having a viscosity at 100° F. not greater than about 200 centistokes, maintaining in said first reaction zone an alkylation temperature and a pressure sufficient to maintain a substantially liquid hydrocarbon phase, correlating the reaction conditions and the activity of said complex catalyst in a manner such that the concentration of unreacted ethylene in the first reaction zone is between about 0.2 and about 3 mol per cent of the hydrocarbons present and such that the viscosity of said liquid complex catalyst is maintained at not more than about 200 centistokes at 100° C., removing from effluents of said first reaction zone a hydrocarbon fraction comprising diisopropyl and a hydrocarbon fraction comprising unreacted ethylene and isobutane, passing said ethylene-isobutane fraction to a second reaction zone and reacting same under alkylation reaction conditions similar to those employed in said first reaction zone and in the presence of a liquid complex catalyst similar to that employed in said first reaction zone but containing a higher proportion of aluminum halide, recovering from effluents of said second reaction zone a hydrocarbon fraction comprising diisopropyl so produced, adding to the catalyst used in said second reaction zone an aluminum halide to maintain the activity of said catalyst at a desired level, removing from said second reaction zone a portion of the catalyst used therein in an amount such as to maintain the catalyst bulk substantially constant, and passing catalyst so removed to said first reaction zone to maintain the activity of said catalyst at a desired level.

HAROLD J. HEPP.

Certificate of Correction

Patent No. 2,410,498.

November 5, 1946.

HAROLD J. HEPP

It is hereby certified that errors appear in the printed specification of the above numbered patent requiring correction as follows: Column 3, line 15, for "hdyrocarbon" read *hydrocarbon*; column 4, line 37, for "85 per cent" read *55 per cent*; column 13, line 4, claim 2, for "actvity" read *activity*; and that the said Letters Patent should be read with these corrections therein that the same may conform to the record of the case in the Patent Office.

Signed and sealed this 4th day of March, A. D. 1947.

[SEAL]

LESLIE FRAZER,
*First Assistant Commissioner of Patents.*